(12) United States Patent
Kasai et al.

(10) Patent No.: US 12,181,319 B2
(45) Date of Patent: Dec. 31, 2024

(54) FLOW SENSOR CHIP

(71) Applicants: Takashi Kasai, Kyoto (JP); Koji Momotani, Kyoto (JP)

(72) Inventors: Takashi Kasai, Kyoto (JP); Koji Momotani, Kyoto (JP)

(73) Assignee: MMI SEMICONDUCTOR CO., LTD., Tokyo (JP)

( * ) Notice: Subject to any disclaimer, the term of this patent is extended or adjusted under 35 U.S.C. 154(b) by 0 days.

(21) Appl. No.: 18/598,469

(22) Filed: Mar. 7, 2024

(65) Prior Publication Data

US 2024/0210226 A1 Jun. 27, 2024

Related U.S. Application Data

(62) Division of application No. 17/653,705, filed on Mar. 7, 2022, now Pat. No. 11,953,357.

(30) Foreign Application Priority Data

Mar. 11, 2021 (JP) ................................. 2021-039435

(51) Int. Cl.
*G01F 1/688* (2006.01)
*G01N 25/18* (2006.01)
*G01F 15/16* (2006.01)

(52) U.S. Cl.
CPC ........... *G01F 1/6888* (2013.01); *G01N 25/18* (2013.01)

(58) Field of Classification Search
CPC ........ G01F 1/6888; G01F 1/688; G01F 15/16; G01F 1/68; G01N 25/18
See application file for complete search history.

(56) References Cited

U.S. PATENT DOCUMENTS 5,291,781 A 3/1994 Nagata et al.
6,502,459 B1 1/2003 Bonne et al.
(Continued)

FOREIGN PATENT DOCUMENTS

JP 2002-156283 5/2002
JP 2020-122747 8/2020
(Continued)

OTHER PUBLICATIONS

Extended European Search Report mailed on Jul. 29, 2022 with respect to the corresponding European patent application No. 22160798.9.

*Primary Examiner* — Peter J Macchiarolo
*Assistant Examiner* — Anthony W Megna Fuentes
(74) *Attorney, Agent, or Firm* — IPUSA, PLLC

(57) ABSTRACT

A flow sensor chip includes a substrate in which a cavity having an opening is formed; a membrane provided on a surface of the substrate so as to cover the opening; a heater provided inside the membrane; a first thermopile and a second thermopile provided in the membrane, the heater being interposed between the first thermopile and the second thermopile; and a heat conduction member serving as a heat conduction path between the substrate and the membrane. A first hot junction and a first cold junction of a thermocouple provided in the first thermopile and a second hot junction and a second cold junction of a thermocouple provided in the second thermopile are arranged at positions overlapping with the opening as viewed from a direction normal to the surface of the substrate.

6 Claims, 6 Drawing Sheets

(56) References Cited

U.S. PATENT DOCUMENTS

| | | | |
|---|---|---|---|
| 6,779,712 | B2 | 8/2004 | Kleinlogel et al. |
| 8,286,478 | B2 | 10/2012 | Speldrich |
| 10,094,691 | B2 | 10/2018 | Figi et al. |
| 2008/0044939 | A1* | 2/2008 | Nassiopoulou ........ G01K 7/028 |
| | | | 438/54 |
| 2014/0190251 | A1* | 7/2014 | Huang .................... G01F 1/692 |
| | | | 73/204.24 |

FOREIGN PATENT DOCUMENTS

| | | |
|---|---|---|
| WO | 2021/078776 | 4/2021 |
| WO | 2022/030039 | 2/2022 |

* cited by examiner

FLOW SENSOR CHIP

CROSS-REFERENCE TO RELATED APPLICATION

The present application is a divisional application of and claims the benefit of priority under 35 U.S.C. 120 of U.S. patent application Ser. No. 17/653,705 filed on Mar. 7, 2022, which is based on and claims priority to Japanese Priority Application No. 2021-039435 filed on Mar. 11, 2021. The entire contents of these applications are hereby incorporated herein by reference.

BACKGROUND

1. Field of the Invention

The present disclosure relates to a flow sensor chip.

2. Description of the Related Art

There are various conventional flow sensors for detecting the flow rate and the flow velocity of gas. One of such flow sensors is a thermal flow sensor. The thermal flow sensor has a heater at the center of the sensor chip, and has an upstream-side thermocouple and a downstream-side thermocouple which are disposed on either side of the heater. Further, by making use of the fact that the temperature distribution of atmosphere heated by the heater changes according to the flow rate of gas flowing on the surface of the sensor chip, the flow rate of gas is detected from a difference in electromotive force between the upstream-side thermocouple and the downstream-side thermocouple (see Japanese Patent Laid-Open No. 2020-122747).

SUMMARY

An aspect of an embodiment of the present disclosure provides a flow sensor chip including: a substrate in which a cavity having an opening is formed; a membrane provided on a surface of the substrate so as to cover the opening; a heater provided inside the membrane; a first thermopile and a second thermopile provided in the membrane, the heater being interposed between the first thermopile and the second thermopile; and a heat conduction member serving as a heat conduction path between the substrate and the membrane, wherein a first hot junction and a first cold junction of a thermocouple provided in the first thermopile and a second hot junction and a second cold junction of a thermocouple provided in the second thermopile are arranged at positions overlapping with the opening as viewed from a direction normal to the surface of the substrate; wherein the heat conduction member includes: a first heat conduction member serving as a heat conduction path between the first cold junction and the substrate; and a second heat conduction member serving as a heat conduction path between the second cold junction and the substrate; and wherein the first heat conduction member is provided inside the membrane, and extends from the area where the membrane and the substrate overlap with each other, as viewed from the direction normal to the surface of the substrate, to a side of the first cold junction, and the second heat conduction member is provided inside the membrane, and extends from the area where the membrane and the substrate overlap with each other, as viewed from the direction normal to the surface of the substrate, to a side of the second cold junction.

DESCRIPTION OF THE EMBODIMENTS

There are various conventional flow sensors for detecting the flow rate and the flow velocity of gas. One of such flow sensors is a thermal flow sensor. The thermal flow sensor has a heater at the center of the sensor chip, and has an upstream-side thermocouple and a downstream-side thermocouple which are disposed on either side of the heater. Further, by making use of the fact that the temperature distribution of atmosphere heated by the heater changes according to the flow rate of gas flowing on the surface of the sensor chip, the flow rate of gas is detected from a difference in electromotive force between the upstream-side thermocouple and the downstream-side thermocouple (see Japanese Patent Laid-Open No. 2020-122747).

Figure 1:
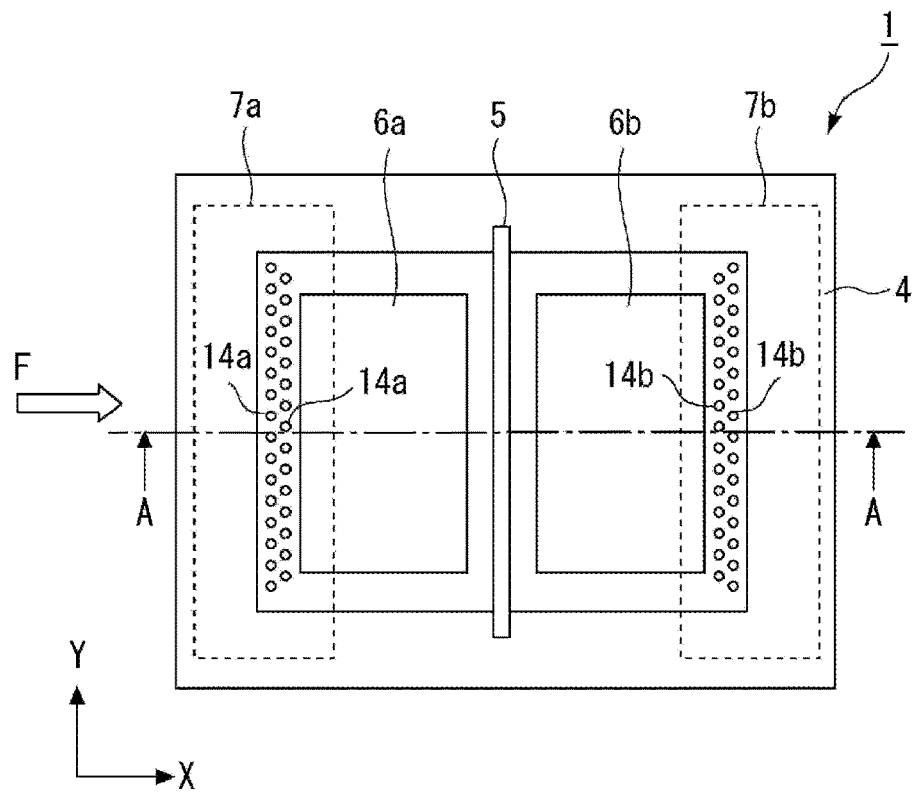
FIG. 1 is a plan view illustrating a flow sensor chip according to a first embodiment.

In a case of a detection apparatus as illustrated in FIG. 1 of Japanese Patent Laid-Open No. 2020-122747, a hot junction of the upstream-side thermocouple, a hot junction of the downstream-side thermocouple, and the heater are provided in an opening portion of a cavity provided in the substrate, and heat transfer via the substrate is unlikely to occur. Conversely, a cold junction of the upstream-side thermocouple and a cold junction of the downstream-side thermocouple are situated in an area where a film covering the thermocouples is in contact with the substrate. In this case, the temperatures of the two cold junctions are likely to be maintained constant via the substrate.

However, with respect to the shape and the position of the cavity provided in the substrate, it is difficult to completely eliminate error in the dimensions that occur in the process. Therefore, if the error in the dimensions is not within the allowable range, the positions of the hot junctions and the cold junctions with reference to the cavity are not necessarily symmetrical in the upstream-side thermocouple and the downstream-side thermocouple. Furthermore, in a case where a temperature distribution occurs in the substrate, the cold junctions provided inside the film in the area that overlaps with the substrate when viewed from a direction normal to the substrate are different in the influence of heat received from the substrate, so that a temperature difference occurs at the cold junctions.

As a result, even though there is actually no flow of gas, the temperature distribution of atmosphere heated by the heater does not become symmetrical due to the influence of the substrate, and accordingly, a difference in electromotive force occurs between the upstream-side thermocouple and the downstream-side thermocouple, which may reduce the detection accuracy of the flow rate of gas. Furthermore, because of the variation in the dimensions of the cavity, the detection result of the flow rate may vary.

Accordingly, it is desired to provide a flow sensor chip with a new configuration in which the detection accuracy of the flow rate is less likely to be affected by variation in the dimensions of the cavity formed in the substrate.

In order to solve the above-described problems, an aspect of an embodiment of the present disclosure is a flow sensor chip that includes a substrate in which a cavity having an opening is formed, a membrane provided on a surface of the substrate so as to cover the opening, a heater provided inside the membrane, a first thermopile and a second thermopile provided in the membrane, the heater being interposed between the first thermopile and the second thermopile, and a heat conduction member serving as a heat conduction path between the substrate and the membrane. In this flow sensor chip, a first hot junction and a first cold junction of a thermocouple provided in the first thermopile and a second hot junction and a second cold junction of a thermocouple provided in the second thermopile are arranged at positions overlapping with the opening as viewed from a direction normal to the surface of the substrate. The heat conduction member includes: a first heat conduction member serving as a heat conduction path between the first cold junction and the substrate; and a second heat conduction member serving as a heat conduction path between the second cold junction and the substrate.

According to this aspect, the first cold junction and the second cold junction are arranged at positions overlapping with the opening as viewed from a direction normal to the surface of the substrate. Specifically, the first cold junction and the second cold junction are not included in the area where the substrate and the membrane are in contact with each other, but are included in an area where the membrane faces the cavity, not facing the substrate. Therefore, even in a case where the dimensions (the shape) of the cavity vary and accordingly the size and the position of the area where the substrate and the membrane overlap with each other change from desired values, a difference in an influence (for example, a difference in the cooling effect) received from the substrate by the cold junctions situated at positions away from the substrate is alleviated. In contrast, cooling of the cold junctions via the substrate is achieved by the first heat conduction member serving as the heat conduction path between the first cold junction and the substrate and the second heat conduction member serving as the heat conduction path between the second cold junction and the substrate, and therefore, the temperature of the first cold junction and the temperature of the second cold junction can be made substantially the same as each other, similarly to conventional techniques. Furthermore, even if a temperature distribution occurs in the substrate, the first cold junction and the second cold junction are less likely to directly receive heat from the substrate, and therefore, there is less likelihood of being affected by the temperature distribution.

In this case, the substrate is preferably a material such as, for example, monocrystalline silicon or a ceramic, which are less likely to change the shape due to temperature. Further, the substrate may be a material that can be readily processed with a high degree of accuracy by a semiconductor process. For example, in a case where a cavity is formed by etching of a semiconductor process, the use of monocrystalline silicon allows for easy control of the shape of the cavity. Furthermore, it is preferable that the cavity is formed inside the substrate, and at least one surface of the substrate has an opening. Note that the cavity may have openings on both of the surfaces of the substrate so as to penetrate the substrate. The membrane may have any configuration so long as the membrane can envelope the heater and the thermopiles, and the material of the membrane is not particularly limited. In view of currents flowing through the heater and the thermopiles, the material of the membrane is preferably an insulating thin film that can be formed by a semiconductor process. Furthermore, the heater and the thermopiles provided inside the membrane do not have to be completely enveloped, and portions of the heater and the thermopiles may be exposed to the outside or joined with other components.

Furthermore, the first heat conduction member may be provided on a surface of the membrane on an opposite side from the substrate, and the first heat conduction member may extend from an area where the membrane and the substrate overlap with each other to a position closer to the first hot junction than is the first cold junction, as viewed from the direction normal to the surface of the substrate. The second heat conduction member may be provided on a surface of the membrane on an opposite side from the substrate, and the second heat conduction member may extend from an area where the membrane and the substrate overlap with each other to a position closer to the second hot junction than is the second cold junction, as viewed from the direction normal to the surface of the substrate. In this case, the first cold junction can release heat to the substrate via the first heat conduction member. Likewise, the second cold junction can release heat to the substrate via the second heat conduction member. The heat conduction members can be made by depositing materials of the heat conduction members to the membrane by a deposition process or the like after the heater and the thermopiles are formed, and when the heat conduction members are provided on a surface of the membrane on the opposite side from the substrate, the manufacturing process can be simplified.

Alternatively, the first heat conduction member may be provided inside the membrane, and may extend from the area where the membrane and the substrate overlap with each other, as viewed from the direction normal to the surface of the substrate, to a side of the first cold junction. The second heat conduction member may be provided inside the membrane, and may extend from the area where the membrane and the substrate overlap with each other, as viewed from the direction normal to the surface of the substrate, to a side of the second cold junction. In this case, it is not necessary to provide the heat conduction members on the membrane, and the thickness of the sensor chip can be reduced. With the heat conduction members being provided inside the membrane, the heat conduction effect is expected to be improved.

Furthermore, the first heat conduction member may be constituted by a metal material that is integrated with the first cold junction. In this case, the first heat conduction member and the first cold junction can be formed simultaneously. Furthermore, the second heat conduction member may be constituted by a metal material that is integrated with the second cold junction. In this case, the second heat conduction member and the second cold junction can be formed simultaneously. When the heat conduction members and the cold junctions are formed simultaneously, the manufacturing process can be simplified. When the heat conduction members and the cold junctions are integrated, the effect of improving the heat conduction can be enhanced.

Furthermore, a first through hole that allows communication between an outside and the cavity may be formed through the first heat conduction member and the membrane. In addition, a second through hole that allows communication between the outside and the cavity may be formed through the second heat conduction member and the membrane. Therefore, a fluid that is to be detected can cause not only a deviation in the temperature distribution with heat of the heater while passing over the membrane but also a deviation in the temperature distribution in the cavity while passing through the cavity formed inside the substrate. Therefore, the flow rate of the fluid and the detection sensitivity of the flow velocity are improved. In addition, in the flow path in which the fluid flows, a first through hole is formed on the upstream side and a second through hole is formed on the downstream side, so that the fluid can smoothly pass through the cavity.

Furthermore, the first through hole may be a mesh comprised of a plurality of through holes. Furthermore, the second through hole may be a mesh comprised of a plurality of through holes. In this case, deviation of the flow of the fluid passing through the cavity can be alleviated. In addition, because the hole diameter of each through hole is small, foreign matter contained in gas is less likely to pass through the through holes, so that the resistance against foreign matter can be improved.

Alternatively, the first through hole may be a long rectangular hole of which one side is formed along a direction in which the first cold junction is arranged. Furthermore, the second through hole may be a long rectangular hole of which one side is formed along a direction in which the second cold junction is arranged. In this case, the amount of the fluid that passes through the cavity can be increased. Therefore, the flow rate of the fluid and the detection sensitivity of the flow velocity are improved.

The heat conduction member may be electrically connected to a ground potential. In this case, the heat conduction member functions as an electromagnetic shield, and the influence of electrical disturbance affecting currents and signals around the heat conduction member can be alleviated, so that resistance against noise is improved. Furthermore, charged foreign matter is attracted and trapped by the heat conduction member at the ground potential, and accordingly, foreign matter is less likely to enter the cavity from the through holes.

The heat conduction member may be constituted by a metal material containing at least one element selected from the group consisting of gold, platinum, silver and aluminum. In this case, the metal material may be an alloy constituted by multiple elements. In this case, heat is efficiently conducted between the cold junction and the substrate. Furthermore, these metals are materials that are frequently used in semiconductor processes, and it is easy to deposit them to a silicon substrate.

The flow sensor chip may further include a metal terminal provided on the substrate. The heat conduction members and the metal terminal may be constituted by the same material as each other and have the same film thickness as each other. In this case, the heat conduction member and the metal terminal can be formed by the same process. Note that the film thicknesses of the heat conduction member and the metal terminal do not have to be strictly the same as each other, and there may be a variation in the manufacturing process or error to such a degree that does not affect the performance.

The heat conduction member and the metal terminal is constituted by a metal material containing at least one element selected from the group consisting of gold, platinum, silver and aluminum. In this case, the reliability in connecting the heat conduction member and the metal terminal by wire bonding can be improved. Furthermore, when the heat conduction member and the metal terminal are constituted by the same metal material as each other, the manufacturing process can be simplified.

The first heat conduction member may be a metal layer in a rectangular shape or U-shape of which one side is formed along a direction in which the first cold junction of the thermocouple provided in the first thermopile is arranged. The second heat conduction member may be a metal layer in a rectangular shape or U-shape of which one side is formed along a direction in which the second cold junction of the thermocouple provided in the second thermopile is arranged.

Advantageous Effects of the Invention

According to the present disclosure, the detection accuracy of the flow rate is less likely to be affected by error in the dimensions of the cavity formed in the substrate.

APPLICATION EXAMPLE

In this application example, a flow sensor including a MEMS (Micro Electro Mechanical Systems) sensor chip of a thermal type using thermopiles is explained. The flow sensor according to this application example includes two thermopiles constituting a pair, and each of the thermopiles is constituted by a plurality of thermocouples. Each of the thermocouples includes: a hot junction situated on the heater side; and a cold junction situated on the opposite side from the heater and constituting a pair with the hot junction.

In the thermocouple, when the hot junction senses the heat of the heater, an electromagnetic force occurs due to the temperature difference from the cold junction according to the Seebeck effect. When an electromotive force is generated, the temperature difference between the thermopiles can be detected, and the value of the flow rate of the fluid can be measured. In this case, the value of the temperature difference between the thermopiles increases in accordance with an increase in the value of the flow rate of the fluid, and both values are individually correlated. Therefore, the flow rate of the fluid can be obtained by measuring the temperature difference between the thermopiles.

The thermopiles are provided symmetrically with the heater interposed between the thermopiles. It is assumed that a side from which fluid flows along the flow path during flow rate detection is referred to as an upstream side, and an opposite side is referred to as a downstream side. Furthermore, the thermopiles and the heater are provided on a thin insulating film or inside the insulating film, and a portion of the insulating film is formed on the substrate so as to cover the cavity that is a recessed portion, the cavity having an opening through a predetermined surface of the substrate.

However, in the above-described thermopile-type sensor, there is a possibility that when a temperature distribution occurs in the substrate due to an external environment, a temperature difference occurs among the cold junctions of the thermopile, or when the dimensions of the cavity vary, an offset voltage occurs. As a result, disadvantages such as reduction of the measurement accuracy of the thermopile-type sensor and reduction of the productivity due to the requirement for increasing the accuracy in the dimensions may occur.

Figure 2:
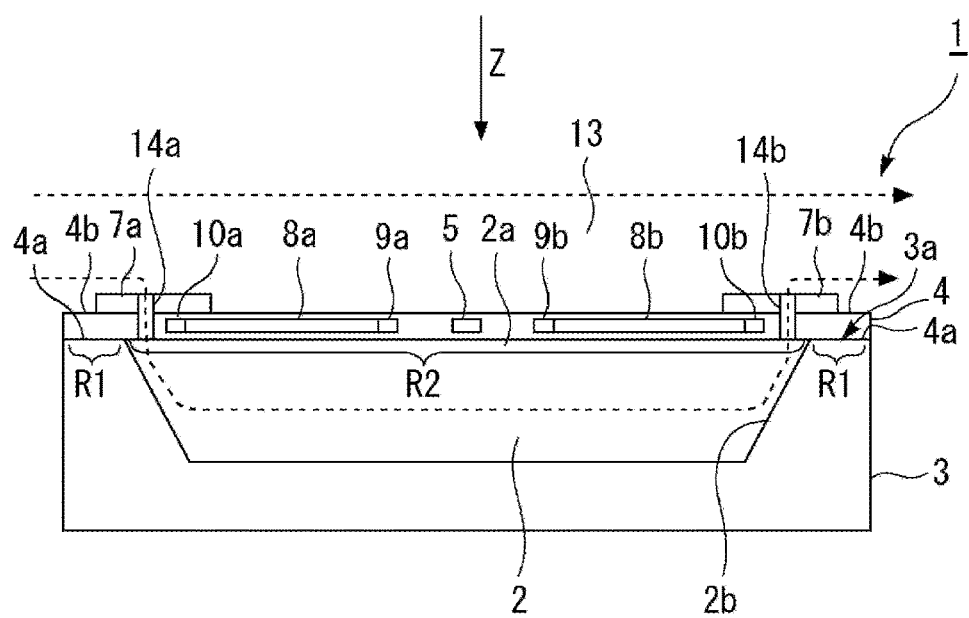
FIG. 2 is a cross-sectional view taken along A-A of the flow sensor chip as illustrated in FIG. 1.

Therefore, in the present disclosure, a flow sensor chip has been devised, in which the positions of the cold junctions with reference to the cavity are improved, so that the detection accuracy of the flow rate is less likely to be affected by error in the dimensions for forming the cavity in the substrate. Specifically, as illustrated in FIG. 1 and FIG. 2, a flow sensor chip 1 has been proposed, in which first hot junctions 9a and first cold junctions 10a of thermocouples 8a provided in a first thermopile 6a and second hot junctions 9b and second cold junctions 10bof thermocouples 8b provided in a second thermopile 6bare provided at positions overlapping with an opening 2a as viewed from a direction Z normal to the surface 3a of a substrate 3. According to this configuration, the cold junctions 10a and 10b are not in contact with the substrate 3 and are away from the substrate 3, and therefore, the cold junctions 10a and 10b are less likely to be affected by the substrate 3 in terms of heat.

Furthermore, the flow sensor chip 1 includes heat conduction members 7a and 7b serving as the heat conduction path between the substrate 3 and a membrane 4, because the effect of cooling the cold junctions 10a and 10b would otherwise be reduced in the above configuration. The heat conduction members 7a and 7bare covers constituted by a material having a higher thermal conductivity than silicon oxide and silicon nitride which are the main materials of the membrane 4. Specifically, the heat conduction members 7a and 7b are, for example, covers with a metal layer that has a higher thermal conductivity. Examples of such metals include aluminum, titanium, copper, tungsten, molybdenum, and tantalum. Alternatively, materials other than metals can be used for the heat conduction members 7a and 7b so long as the materials have a thermal conductivity equal to or more than a predetermined value (for example, equal to or more than 15 [W/m·K]). Furthermore, the heat conduction members 7a and 7b also serve as the heat conduction path between the cold junctions 10a and 10b and the substrate 3, so that even when there is error in the dimensions of the cavity, the cold junctions 10a and 10b are more likely to be cooled, via the substrate 3, to the same temperature as each other, and the detection accuracy of the flow rate of the flow sensor chip 1 is improved.

First Embodiment

Hereinafter, a thermopile-type flow sensor chip according to the first embodiment of the present disclosure is described in detail with reference to the drawings. In the following embodiments explained below, for example, the present disclosure is applied to a flow sensor including a MEMS (Micro Electro Mechanical Systems) sensor chip of a thermal type. However, the present disclosure may also be applied to other thermopile-type sensors such as infrared sensors. A standard flow sensor includes, in addition to a flow sensor chip, a housing constituting the flow path and a circuit that drives the flow sensor chip and processes the output signal. The configuration of the housing and the circuit may be appropriately selected according to the configuration, application, and purpose of the flow sensor chip of the present disclosure. Furthermore, the flow sensor chip according to the present disclosure is not limited to the following configuration.
<Flow Sensor Chip>

FIG. 1 is a plan view illustrating the flow sensor chip 1 according to the first embodiment. FIG. 2 is a cross-sectional view taken along A-A of the flow sensor chip as illustrated in FIG. 1. The flow sensor chip 1 can be applied to a thermal flow sensor that is incorporated into, for example, a gas meter, a combustion device, an internal combustion engine of an automobile and the like, a fuel cell, other industrial devices such as a medical device, and an embedded device, and that measures the amount of fluid that passes through a flow path.

The flow sensor chip 1 includes: the substrate 3 in which a cavity 2 having the opening 2a is formed; the membrane 4 provided on a surface of the substrate 3 so as to cover the opening 2a; a heater 5 provided inside the membrane 4; the first thermopile 6a provided on the upstream side of the heater 5 and the second thermopile 6b provided on the downstream side of the heater 5, the first thermopile 6a and the second thermopile 6b being provided inside the membrane 4; and heat conduction members 7a and 7b serving as the heat conduction path between the substrate 3 and the membrane 4.

As illustrated in FIG. 2, in the flow sensor chip 1, the first hot junctions 9a and the first cold junctions 10a of the thermocouples 8a provided in the first thermopile 6a and the second hot junctions 9b and the second cold junctions 10b of the thermocouples 8bprovided in the second thermopile 6b are arranged at positions overlapping with the opening 2a as viewed from a direction Z normal to the surface 3a (a surface supporting the membrane 4) of the substrate 3b of the substrate 3. The heat conduction members 7a and 7binclude: a first heat conduction member 7a serving as a heat conduction path between the first cold junction 10a and the substrate 3; and a second heat conduction member 7b serving as a heat conduction path between the second cold junction 10b and the substrate 3.

As illustrated in FIG. 1 and FIG. 2, the thermopiles 6a and 6b are provided symmetrically with the heater 5 being interposed between the thermopiles 6a and 6b. The substrate 3 is constituted by a plate-shaped monocrystalline silicon that is processed such that the surface 3a has a predetermined plane orientation. Furthermore, the heater 5 is a resistor constituted by, for example, polysilicon. The shapes of the thermopiles 6a and 6b are in an approximately rectangular shape when the chip surface is seen from above. The first thermopile 6a is provided on the upstream side of the heater 5. The second thermopile 6b is provided on the downstream side of the heater 5. In this case, the upstream side and the downstream side of the heater 5 are defined on the basis of, for example, a direction F in which gas (fluid), i.e., a measurement target of the flow sensor chip 1, normally flows through the flow path on the surface of the flow sensor chip 1.

The heater 5 and the thermopiles 6a and 6bare formed inside the membrane 4 constituted by an insulating material. The membrane 4 is provided on the substrate 3. The entirety of the heater 5 and the entireties of the thermopiles 6a and 6b provided inside the membrane 4 do not have to be completely enveloped in the membrane 4. Portions of the heater 5 and portions of the thermopiles 6a and 6b may be exposed to the outside, or the heater 5 and the thermopiles 6aand 6b may be joined with other components.

The flow sensor chip 1 detects a value indicative of the flow rate of the fluid, i.e., a measurement target, on the basis of temperature detection signals that are output from the two thermopiles 6a and 6b. Specifically, the flow sensor chip 1 calculates a difference between a temperature detection signal that is output from the first thermopile 6a and a temperature detection signal that is output from the second thermopile 6b, and outputs a value indicative of the flow rate of the fluid based on the difference, to an electronic circuit unit (not illustrated) on a subsequent stage. In FIG. 1, two thermopiles 6a and 6b are illustrated, but the number of thermopiles is not particularly limited, so long as there are two or more thermopiles.

Figure 3:
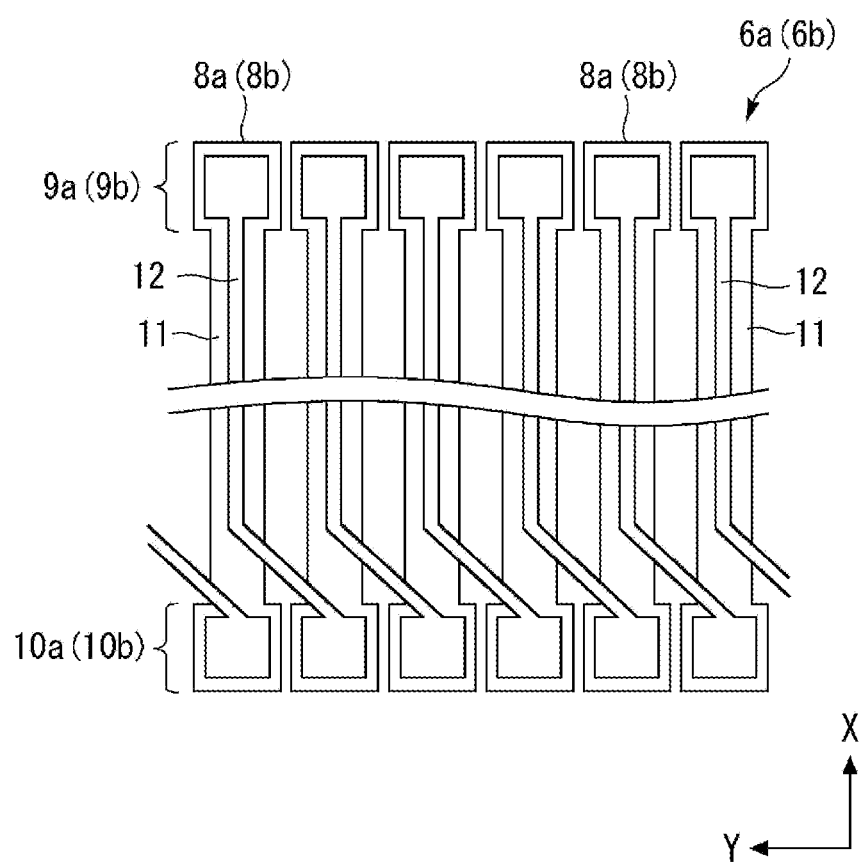
FIG. 3 is a schematic view illustrating an example of configuration of a thermopile.

FIG. 3 is a schematic view illustrating an example of configuration of thermopiles. Although the illustration of the first thermopile 6a in FIG. 1 is simplified, the first thermopile 6a includes the plurality of thermocouples 8a arranged on the membrane 4 with predetermined intervals. The plurality of thermocouples 8a function as temperature sensors connected in series. The first thermopile 6a includes the plurality of first hot junctions 9a arranged side by side in the Y direction of FIG. 1. Furthermore, the first thermopile 6a includes the plurality of first cold junctions 10a arranged in the Y direction of FIG. 1. In the first thermopile 6a, the materials constituting the first terminal 11 and the second terminal 12 of the thermocouple 8a are N-type polysilicon (polysilicon doped with phosphorous (P)) and aluminum (Al), respectively, but the materials are not limited to this combination. The second thermopile 6b is configured substantially the same manner as the first thermopile 6a, and explanation thereabout is omitted.

In this manner, each of the plurality of thermocouples 8a has the metal thin film constituted by aluminum provided on the polysilicon wire, and at both ends of the thermocouple 8a, the first terminal 11, i.e., the polysilicon wire, is connected to the second terminal 12, i.e., the metal thin film. Of the connections at the both ends of the thermocouple 8a, a connection on the same side as the heater 5 is the first hot junction 9a, and a connection on the opposite side from the heater 5 is the first cold junction 10a. The thermocouple 8b has substantially the same configuration as the thermocouple 8a.

In this manner, in the two thermopiles 6a and 6b, the first hot junction 9a and the second hot junction 9b are arranged on the opposite sides, with the heater 5 interposed between the first hot junction 9a and the second hot junction 9b. Furthermore, the first cold junction 10a is provided at one of both ends of the thermocouple 8a that is on the opposite side from an end where the first hot junction 9a is provided. Likewise, the second cold junction 10b is provided at one of both ends of the thermocouple 8b that is on the opposite side from an end where the second hot junction 9b is provided.

Figure 4A:
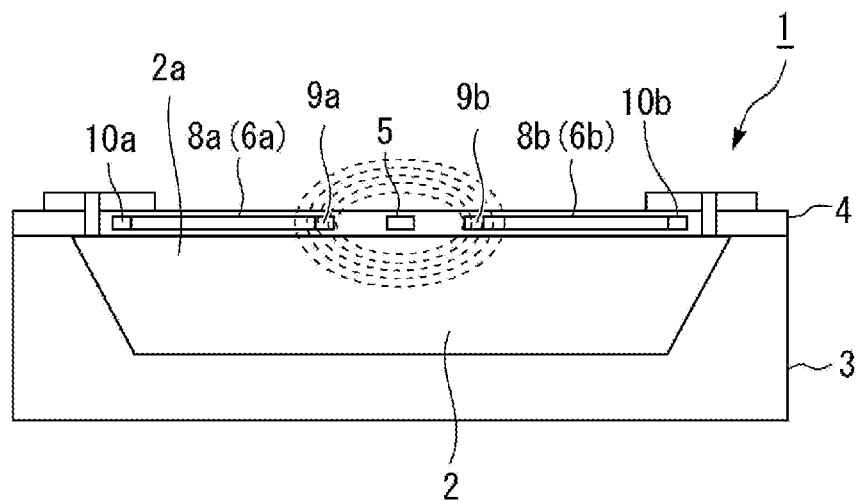
FIG. 4A and FIG. 4B are cross-sectional views for explaining a mechanism of the flow sensor chip according to the first embodiment.
Figure 4B:
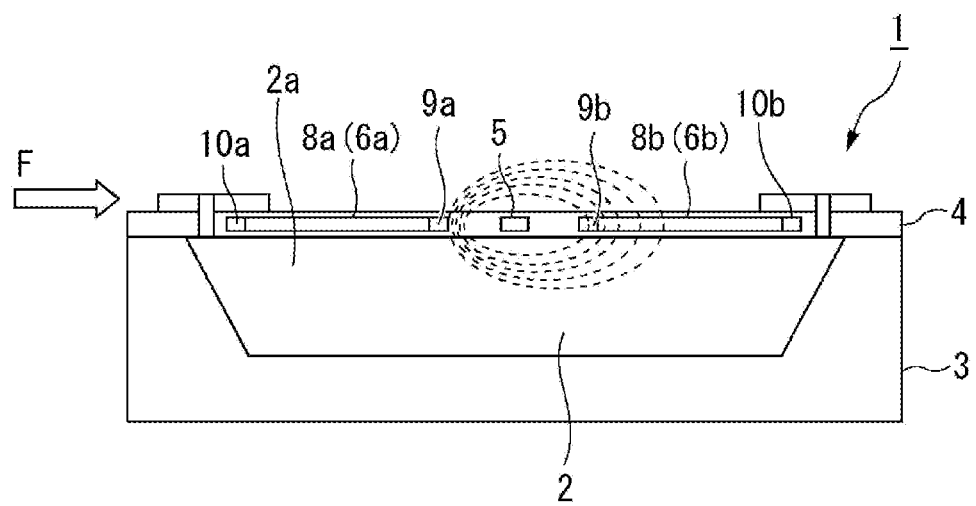

FIG. 4A and FIG. 4B are cross-sectional views for explaining a mechanism of the flow sensor chip 1 according to the first embodiment. In FIG. 4A and FIG. 4B, a temperature distribution that occurs when the heater 5 generates heat is schematically indicated by ellipses of broken lines. In the temperature distribution, the temperature increases toward the heater 5. FIG. 4A schematically illustrates an example of temperature distribution in a case where the heater 5 is energized when the fluid is not flowing. FIG. 4B schematically illustrates an example of temperature distribution in a case where the heater 5 is energized when the fluid is flowing in the direction F indicated by the arrow. The first thermopile 6a, the heater 5, and the second thermopile 6b are arranged in this order in the flow sensor chip 1 along the direction F indicated by the arrow. The longitudinal direction (the Y direction indicated in FIG. 1) of each of the heater 5 and the thermopiles 6a and 6b is orthogonal to (i.e., crosses) the direction of the flow of the fluid.

In a case where the fluid is not flowing, the heat of the heater 5 diffuses symmetrically from the heater 5 as illustrated in FIG. 4A. Therefore, in FIG. 4A, the temperature of the first hot junction 9a provided on the left side (upstream side) of the heater 5 is the same as the temperature of the second hot junction 9b provided on the right side (downstream side) of the heater 5. Accordingly, there is no difference between the temperature detection signal from the thermopile 6a and the temperature detection signal from the thermopile 6b, and no output voltage occurs.

Conversely, when the fluid is flowing, the heat of the heater 5 is affected by the flow of the fluid, and accordingly, the heat of the heater 5 does not diffuse symmetrically from the heater 5, and the heat of the heater 5 diffuses asymmetrically according to the flow of the fluid. Therefore, in FIG. 4B, a difference occurs between the temperature of the first hot junction 9a provided on the left side of the heater 5 and the temperature of the second hot junction 9b provided on the right side of the heater 5. In proportion to this temperature difference, a difference occurs between the temperature detection signal from the thermopile 6a and the temperature detection signal from the thermopile 6b, and an output voltage occurs. Furthermore, because the temperature difference increases in accordance with an increase in the flow velocity, the magnitude of the flow velocity can be detected on the basis of the electromotive forces of the thermopiles 6a and 6b. Furthermore, according to the direction of the flow of the fluid, the sign (positive or negative) of the temperature difference between the two hot junctions 9a and 9b as illustrated in FIG. 4B is reversed, and accordingly the sign (positive or negative) of the output voltage is also reversed. Therefore, the direction of the flow of the fluid can be detected. The flow sensor chip 1 outputs a value indicative of the flow rate by using a deviation of the distribution of the heat of the heater 5 as described above.

In the flow sensor chip 1 according to the present embodiment, the cavity 2 that is a recessed portion is formed in the substrate 3 on which the membrane 4 is provided. Furthermore, the first hot junction 9a of the first thermopile 6a and the second hot junction 9b of the second thermopile 6b are provided at positions that overlap with the opening 2a as viewed from the direction normal to the surface of the substrate 3. Furthermore, because the heat generated from the heater 5 is released into the cavity 2, the diffusion of the generated heat to the inside of the substrate 3 is alleviated. Specifically, heating of the substrate 3 by the heater 5 is alleviated.

Furthermore, in the flow sensor chip 1, the first cold junctions 10a of the first thermopile 6a and the second cold junctions 10b of the second thermopile 6b are provided at positions that overlap with the opening 2a as viewed from the direction normal to the surface of the substrate 3. Specifically, the first cold junction 10a and the second cold junction 10b are not included in an area R1 where the substrate 3 and the membrane 4 are in contact with each other, but are included in an area R2 where the membrane 4 faces the cavity 2, not the substrate 3. Therefore, even in a case where the dimensions (the shape) of the cavity 2 vary and accordingly the size and the position of the area R1 where the substrate 3 and the membrane 4 overlap with each other change from desired values, a difference in the influence received from the substrate 3 by the cold junctions 10a and 10b situated at positions away from the substrate 3 is alleviated. The influence received from the substrate 3 is, for example, influences based on an effect of cooling the heat of the heater 5 with the cold junctions 10a and 10b and an effect of conduction of heat of the substrate 3 varied due to an ambient temperature to the cold junctions 10a and 10b.

Conversely, cooling of the cold junctions 10a and 10b via the substrate 3 is achieved by the heat conduction member 7a serving as the heat conduction path between the first cold junction 10a and the substrate 3 and the second heat conduction member 7b serving as the heat conduction path between the second cold junction 10b and the substrate 3, and therefore, the temperatures of the first cold junction 10a and the second cold junction 10b can be made substantially the same as each other, similarly to conventional examples. Furthermore, even if a temperature distribution occurs in the substrate 3, the first cold junction 10a and the second cold junction 10b do not directly receive heat from the substrate 3, and therefore, the first cold junction 10a and the second cold junction 10b are less likely to be affected by the temperature distribution. As a result, with the flow sensor chip 1 according to the present embodiment, error in the dimensions of the cavity 2 formed in the substrate 3 is less likely to affect the detection accuracy of the flow rate (for example, variation in the offset voltage).

In other words, even when variation (tolerance) in the dimensions of the cavity 2 during manufacturing of the cavity 2 is relatively large, reduced detection accuracy of the flow rate can be alleviated, and therefore, the yield of non-defective products in the process of forming the cavity 2 in the substrate 3 can be increased. In particular, in a case where the cavity 2 is formed, by etching, in the substrate 3 constituted by monocrystalline silicon, it is difficult to perform processing with a small variation in the dimensions of the cavity 2, and therefore, it is preferable to adopt a configuration in which variation in the dimensions of the cavity 2 is less likely to affect the detection accuracy of the flow rate, as in the flow sensor chip 1 according to the present embodiment.

Furthermore, the first heat conduction member 7a is provided on a surface 4b of the membrane 4 on the opposite side from a surface 4a of the membrane 4 that is in contact with the substrate 3, and extends from the area R1 where the membrane 4 is in contact with the substrate 3, as viewed from the direction normal to the surface of the substrate 3, to above the first cold junction 10a. Furthermore, the second heat conduction member 7b is provided on the surface 4b of the membrane 4 on the opposite side from the surface 4a of the membrane 4 that is in contact with the substrate 3, and extends from the area R1 where the membrane 4 is in contact with the substrate 3, as viewed from the direction normal to the surface of the substrate 3, to above the second cold junction 10b. In this case, the first cold junction 10a can release heat via the first heat conduction member 7a to the substrate 3. Similarly, the second cold junction 10b can release heat via the second heat conduction member 7b to the substrate 3.

In the present embodiment, an example in which the substrate 3 is constituted by monocrystalline silicon has been explained as an example. However, the substrate 3 may be constituted by any material so long as the cavity 2 of a desired shape can be formed by etching or other processes. Furthermore, the cavity 2 according to the first embodiment is formed inside the substrate 3, and has the opening 2a through the surface 3a that is one of the surfaces of the substrate 3. Alternatively, openings may be formed on both of the surfaces of the substrate 3 so as to penetrate the substrate 3. Furthermore, side surfaces 2b of the cavity 2 are inclined such that the side surfaces 2b expand toward the opening 2a.

Furthermore, in the flow sensor chip 1 according to the present embodiment, the first heat conduction member 7a and the membrane 4 are formed with first through holes 14a that allow communication between the outside where a flow path is formed (the flow path 13) and the cavity 2. In addition, the second heat conduction member 7b and the membrane 4 are formed with second through holes 14b that allow communication between the outside where the flow path is formed (the flow path 13) and the cavity 2. In this case, a fluid that is to be detected causes a deviation in the temperature distribution due to the heat of the heater 5 while passing above the membrane 4, and causes a deviation in the temperature distribution in the cavity while passing through the cavity 2 formed inside the substrate 3. Therefore, the detection sensitivities of the flow rate of the fluid and the flow velocity are improved. Furthermore, the first through holes 14a are formed on the upstream side and the second through holes 14b are formed on the downstream side of the flow path 13 in which the fluid flows, so that the fluid can smoothly pass through the inside of the cavity 2.

Furthermore, as illustrated in FIG. 1, the plurality of first through holes 14a are formed in a mesh form. Likewise, the plurality of second through holes 14b are formed in a mesh form as illustrated in FIG. 1. In this case, a deviation of flow of the fluid that passes through the cavity can be alleviated. Furthermore, because the hole diameter of each through hole is small, foreign matter included in gas is less likely to pass through the through holes, and the resistance against foreign matter is improved.

Furthermore, the heat conduction members 7a and 7b are constituted by a metal material containing at least one element selected from the group consisting of aluminum, titanium (Ti), copper (Cu), tungsten (W), molybdenum (Mo), and tantalum (Ta). In this case, the metal material may be an alloy constituted by a plurality of elements. In this case, heat is efficiently conducted between the cold junctions 10a and 10b and the substrate 3. The metal material generally has a high infrared reflectance (a low emissivity), and therefore, the influence of radiant heat transfer from the outside world to the substrate 3 can be reduced by the heat conduction members 7a and 7b. Furthermore, a wide range of the substrate 3 is covered with a metal material having a higher thermal conductivity than the substrate 3 and the membrane 4, so that the temperature distribution of the substrate 3 can be homogenized.

Second Embodiment

Figure 5:
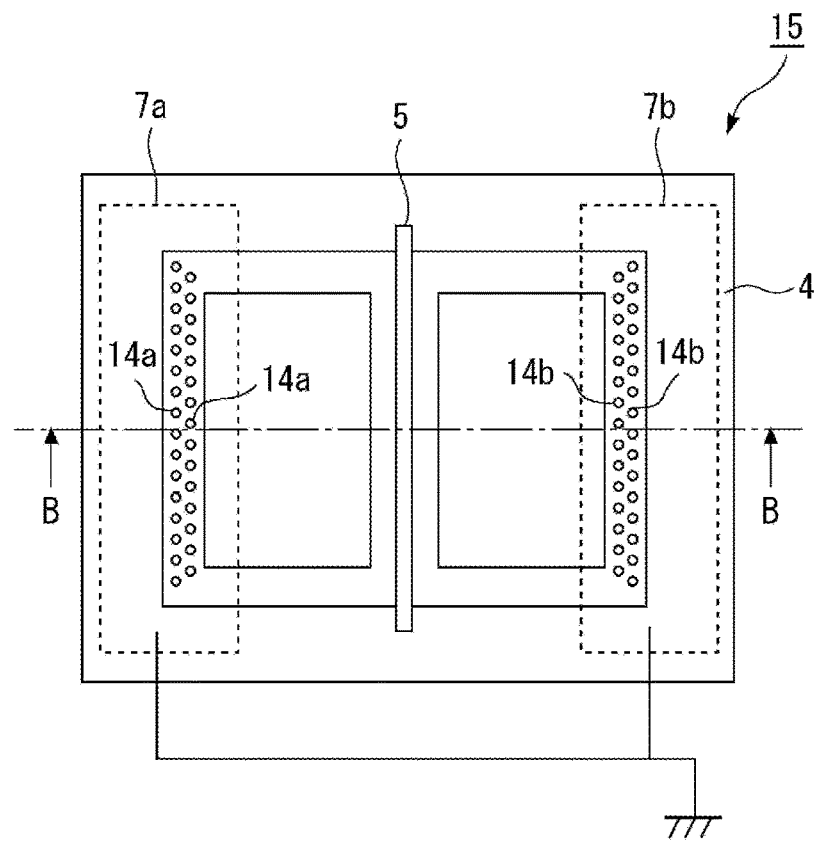
FIG. 5 is a plan view illustrating a flow sensor chip according to a second embodiment.
Figure 6:
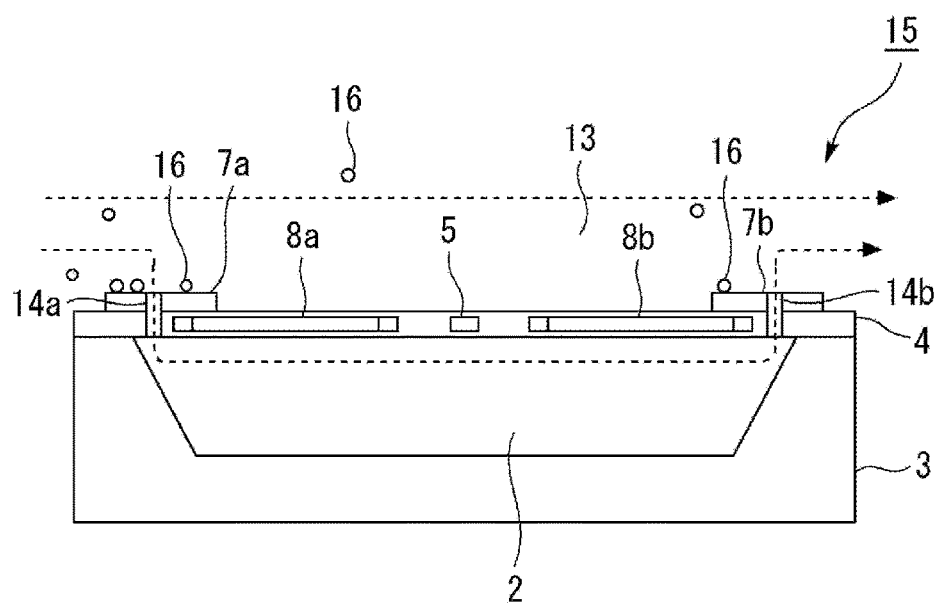
FIG. 6 is a cross-sectional view taken along B-B of the flow sensor chip illustrated in FIG. 5.

FIG. 5 is a plan view illustrating a flow sensor chip 15 according to the second embodiment. FIG. 6 is a cross-sectional view taken along B-B of the flow sensor chip 15 illustrated in FIG. 5. The flow sensor chip 15 according to the second embodiment has the same configuration as the flow sensor chip 1 according to the first embodiment except that the heat conduction members 7a and 7b are electrically connected to the ground potential. Accordingly, in the following explanation, the same components as the components of the flow sensor chip 1 are denoted with the same reference numerals, and explanation thereabout is omitted as necessary.

In the flow sensor chip 15 according to the second embodiment, the heat conduction members 7a and 7b, i.e., conductive materials such as metal, function as an electromagnetic shield to reduce the influence of electrical disturbance on the currents and signals around the heat conduction member, so that resistance against noise is improved. Furthermore, charged foreign matter 16 is attracted and trapped by the heat conduction members 7a and 7b at the ground potential, and accordingly, foreign matter 16 is less likely to enter the cavity 2 from the through holes 14a and 14b. Furthermore, because the through holes 14a and 14b that are inlets through which the fluid enters the cavity 2 are formed in the heat conduction members 7a and 7b configured to capture the foreign matter 16, the foreign matter 16 can be captured efficiently.

Third Embodiment

Figure 7:
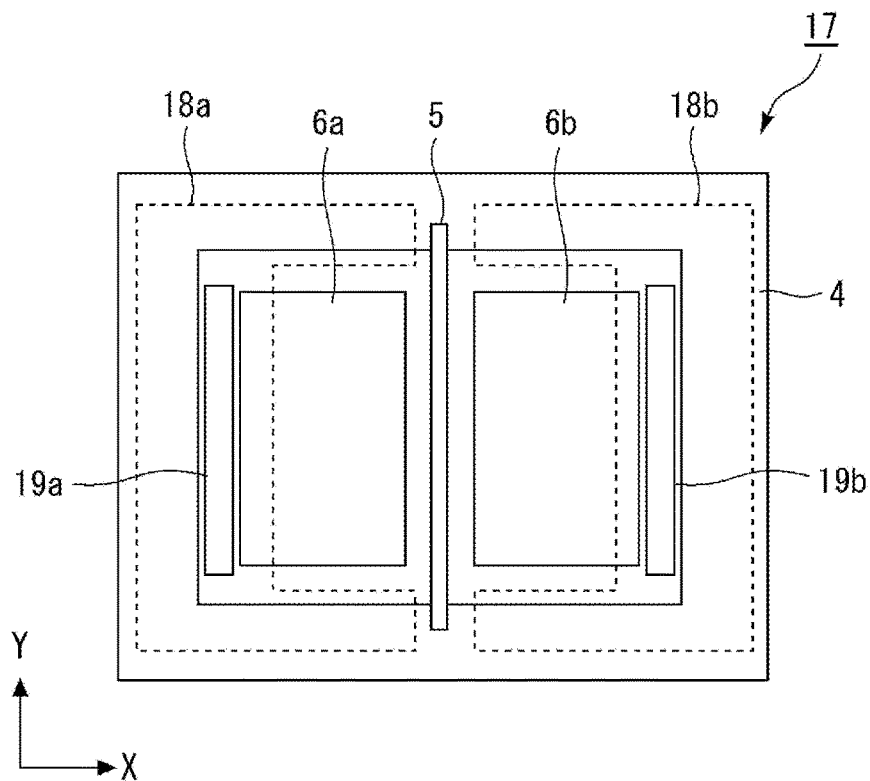
FIG. 7 is a plan view illustrating a flow sensor chip according to a third embodiment.

FIG. 7 is a plan view illustrating a flow sensor chip 17 according to the third embodiment. The flow sensor chip 17 according to the third embodiment has the same configuration as the flow sensor chip 1 according to the first embodiment except for the shape of the heat conduction member and the shape of the through hole. Accordingly, in the following explanation, the same components as the components of the flow sensor chip 1 are denoted with the same reference numerals, and explanation thereabout is omitted as necessary.

In the flow sensor chip 17 according to the third embodiment, heat conduction members 18a and 18b constituted by U-shaped metal layers, of which one side is formed along a direction in which the cold junctions 10a and 10b are arranged, are provided instead of the heat conduction members 7a and 7b in rectangular shape. Furthermore, a first through hole 19a and a second through hole 19b are long holes in a rectangular shape of which one side is formed along the direction in which the cold junctions 10a and 10b are arranged. Therefore, the fluid can readily flow into the cavity 2 via the first through hole 19a, and can readily flow out to the outside via the second through hole 19b, so that the amount of fluid passing through the cavity 2 can be increased. As a result, in the flow sensor chip 17, the detection sensitivities of the flow rate of the fluid and the flow velocity is improved.

Fourth Embodiment

Figure 8:
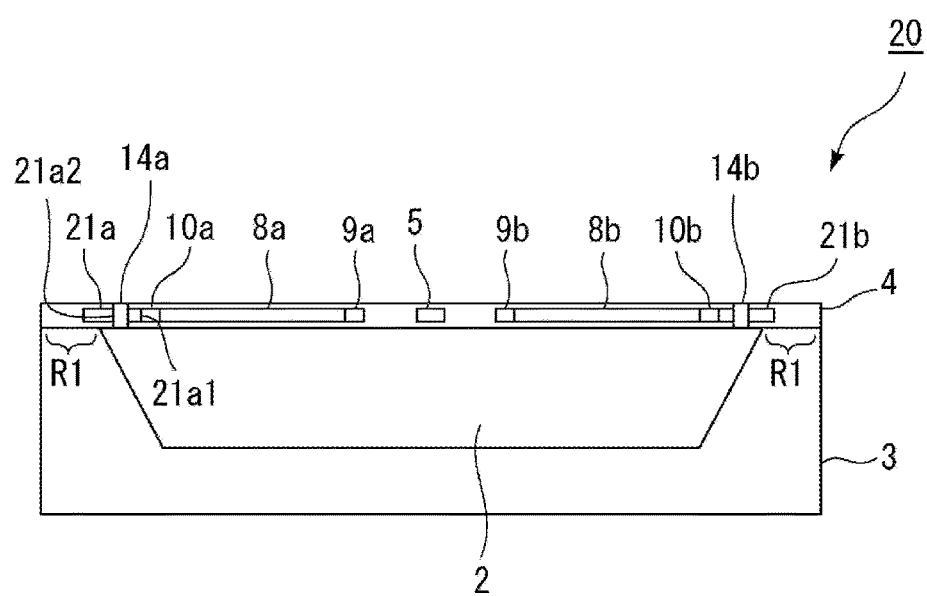
FIG. 8 is a cross-sectional view illustrating a flow sensor chip according to a fourth embodiment.
Figure 9:
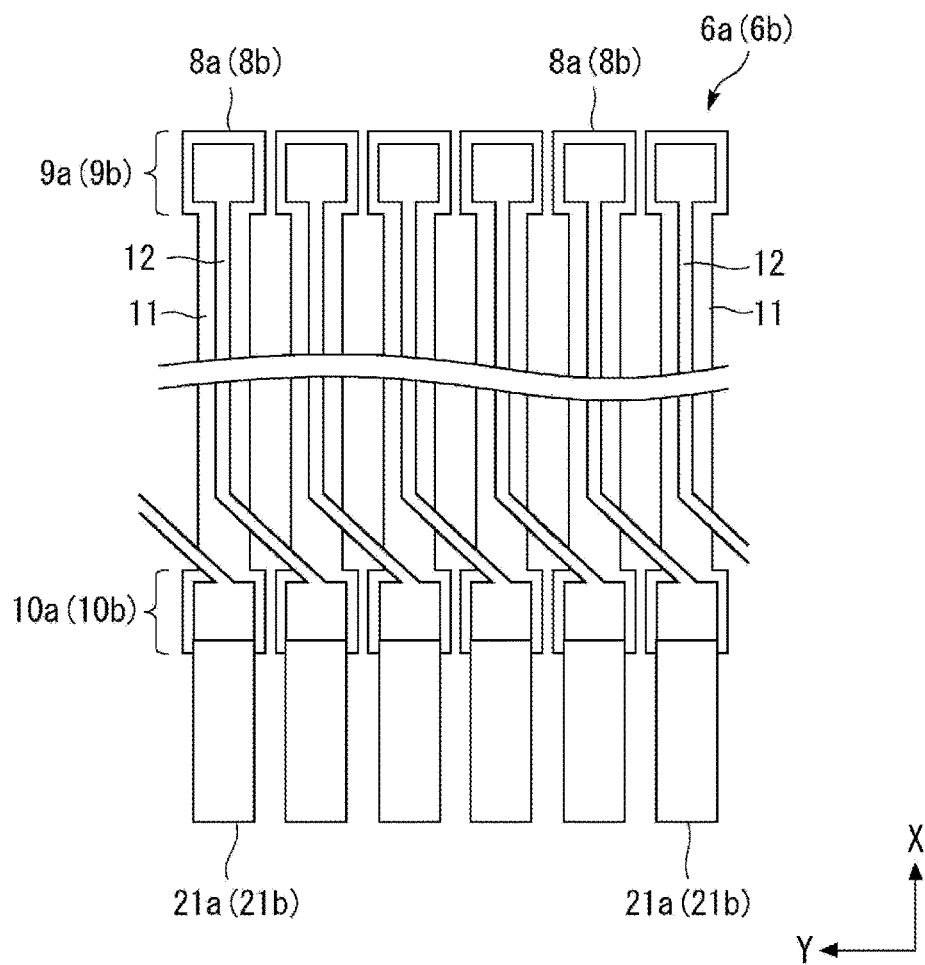
FIG. 9 is an enlarged view illustrating the vicinity of a thermopile as illustrated in FIG. 8.

FIG. 8 is a cross-sectional view illustrating a flow sensor chip 20 according to the fourth embodiment. FIG. 9 is an enlarged view illustrating the vicinity of the thermopile as illustrated in FIG. 8. The flow sensor chip 20 according to the fourth embodiment mainly differs from the flow sensor chip 1 according to the first embodiment in that heat conduction members 21a and 21b are provided, inside the membrane 4, in such a manner as to be connected to the cold junctions 10a and 10b. Accordingly, in the following explanation, the same components as the components of the flow sensor chip 1 are denoted with the same reference numerals, and explanation thereabout is omitted as necessary.

In the flow sensor chip 20 according to the fourth embodiment, the heat conduction members 21a and 21b that achieve the same function as the above-described heat conduction members 7a and 7b are provided on the outside of the cold junctions 10a and 10b (on the opposite side of the cold junctions 10a and 10b from the center of the thermocouples 8a and 8b at which the heater 5 is provided). The heat conduction members 21a and 21b are in a rectangular shape, and are the same in number as the number of the cold junctions 10a and 10b. The heat conduction members 21a and 21b have first ends 21a1 connected to the cold junctions 10a and 10b and second ends 21a2 on the opposite side from the first ends 21a1. The second ends 21a2 extend to the area R1 where the substrate 3 and the membrane 4 overlap with each other. In other words, the heat conduction members 21a and 21b are provided inside the membrane 4, and extend from the area R1 where the substrate 3 and the membrane 4 overlap with each other, as viewed from the direction normal to the surface 3a of the substrate 3, to sides of the cold junctions 10a and 10b to be integrated with the cold junctions 10a and 10b. In this case, the heat conduction members 21a and 21b are not required to be provided on the membrane 4, and the thickness of the flow sensor chip 20 can be reduced. The heat conduction members and the cold junctions can be formed simultaneously, so that the manufacturing process can be simplified. Furthermore, because the heat conduction members and the cold junctions are integrated, the effect of heat conduction can be increased.

Fifth Embodiment

Figure 10:
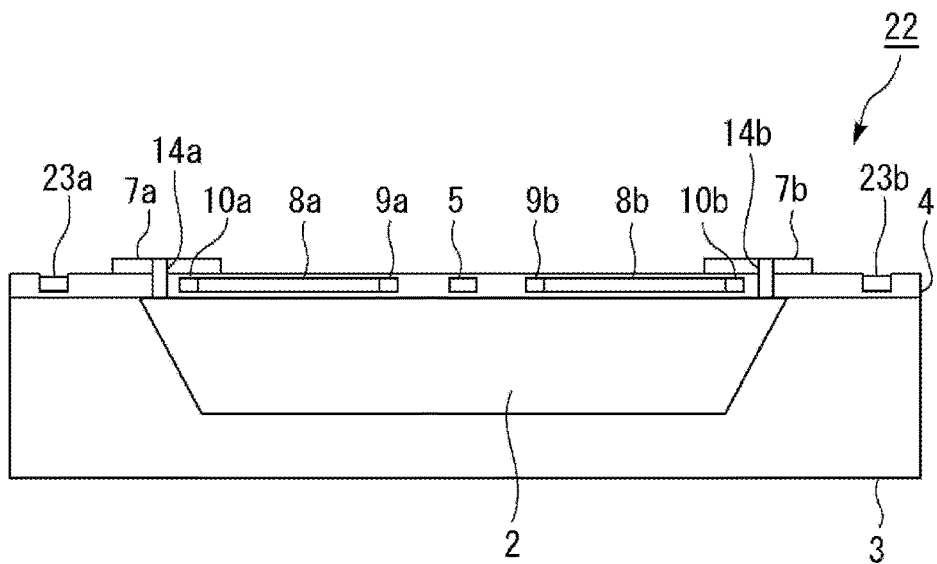
FIG. 10 is a cross-sectional view illustrating a flow sensor chip according to a fifth embodiment.

FIG. 10 is a cross-sectional view illustrating a flow sensor chip 22 according to the fifth embodiment. The flow sensor chip 22 according to the fifth embodiment is mainly different from the flow sensor chip 1 according to the first embodiment in that the flow sensor chip 22 includes metal terminals 23a and 23b provided on the substrate 3. Accordingly, in the following explanation, the same components as the components of the flow sensor chip 1 are denoted with the same reference numerals, and explanation thereabout is omitted as necessary.

In the flow sensor chip 22 according to the fifth embodiment, the heat conduction members 7a and 7b and the metal terminals 23a and 23b may be constituted by the same material as each other and have the same film thickness as each other. In this case, the heat conduction members 7a and 7b and the metal terminals 23a and 23b can be formed by the same process, and the manufacturing process can be simplified. Note that the film thicknesses of the heat conduction member and the metal terminal do not have to be strictly the same as each other, and there may be a variation in the manufacturing process or error to such a degree that does not affect the performance.

Furthermore, the heat conduction members 7a and 7b and the metal terminals 23a and 23b are constituted by a metal material containing at least one element selected from the group consisting of gold, platinum, silver, and aluminum. In this case, the reliability in connecting the heat conduction member 7a and the metal terminal 23a and connecting the heat conduction member 7b and the metal terminal 23b by wire bonding can be improved.

The embodiments for carrying out the present disclosure have been hereinabove explained in detail as examples with reference to drawings. However, it is to be understood that the dimensions, materials, and relative arrangements of the components described in the embodiments are to be changed as appropriate depending on the configuration of an apparatus to which the present disclosure is applied and depending on various conditions. That is, the scope of the present disclosure is not limited to the above-mentioned embodiments, and the present disclosure also includes aspects in which the configurations of the embodiments are appropriately combined or replaced.

In order to allow comparison between the elements in the claims and the elements in the present disclosure, the claims of the present disclosure are recited with corresponding reference numerals of the drawings.

Supplementary Note 1

A flow sensor chip (1) including:
a substrate (3) in which a cavity (2) having an opening (2a) is formed;
a membrane (4) provided on a surface (3a) of the substrate (3) so as to cover the opening;
a heater (5) provided inside the membrane;

a first thermopile (6a) and a second thermopile (6b) provided in the membrane, the heater being interposed between the first thermopile and the second thermopile; and a heat conduction member (7a, 7b) serving as a heat conduction path between the substrate (3) and the membrane (4), wherein a first hot junction (9a) and a first cold junction (10a) of a thermocouple (8a) provided in the first thermopile (6a) and a second hot junction (9b) and a second cold junction (10b) of a thermocouple (8b) provided in the second thermopile (6b) are arranged at positions overlapping with the opening as viewed from a direction normal to the surface of the substrate, and the heat conduction member includes: a first heat conduction member (7a) serving as a heat conduction path between the first cold junction (10a) and the substrate (3); and a second heat conduction member (7b) serving as a heat conduction path between the second cold junction (10b) and the substrate (3).

DESCRIPTION OF SYMBOLS 1 flow sensor chip
2 cavity
2a opening
3 substrate
3a surface
4 membrane
5 heater
6a first thermopile
6b second thermopile
7a first heat conduction member
7b second heat conduction member
8a thermocouple
8b thermocouple
9a first hot junction
9b second hot junction
10a first cold junction
10b second cold junction
14a first through hole
14b second through hole

What is claimed is:

1. A flow sensor chip comprising: a substrate in which a cavity having an opening is formed; a membrane provided on a surface of the substrate so as to cover the opening; a heater provided inside the membrane; a first thermopile and a second thermopile provided in the membrane, the heater being interposed between the first thermopile and the second thermopile; and a heat conduction member serving as a heat conduction path between the substrate and the membrane, wherein a first hot junction and a first cold junction of a thermocouple provided in the first thermopile and a second hot junction and a second cold junction of a thermocouple provided in the second thermopile are arranged at positions overlapping with the opening as viewed from a direction normal to the surface of the substrate; wherein the heat conduction member includes: a first heat conduction member serving as a heat conduction path between the first cold junction and the substrate; and a second heat conduction member serving as a heat conduction path between the second cold junction and the substrate; wherein the first heat conduction member is provided inside the membrane, and extends from the area where the membrane and the substrate overlap with each other, as viewed from the direction normal to the surface of the substrate, to a side of the first cold junction, the second heat conduction member is provided inside the membrane, and extends from the area where the membrane and the substrate overlap with each other, as viewed from the direction normal to the surface of the substrate, to a side of the second cold junction, the first heat conduction member includes a metal material that is integrated with the first cold junction, and the second heat conduction member includes a metal material that is integrated with the second cold junction.

2. The flow sensor chip according to claim 1, wherein a first through hole that allows communication between an outside and the cavity is formed through the first heat conduction member and the membrane, and a second through hole that allows communication between the outside and the cavity is formed through the second heat conduction member and the membrane.

3. The flow sensor chip according to claim 2, wherein the first through hole is formed along a direction in which the first cold junction is arranged, and the second through hole is formed along a direction in which the second cold junction is arranged.

4. The flow sensor chip according to claim 3, wherein the first through hole is a long rectangular hole of which one side is formed along a direction in which the first cold junction is arranged, and the second through hole is a long rectangular hole of which one side is formed along a direction in which the second cold junction is arranged.

5. The flow sensor chip according to claim 1, wherein the first heat conduction member is a metal layer in a rectangular shape or U-shape of which one side is formed along a direction in which the first cold junction of the thermocouple provided in the first thermopile is arranged, and the second heat conduction member is a metal layer in a rectangular shape or U-shape of which one side is formed along a direction in which the second cold junction of the thermocouple provided in the second thermopile is arranged.

6. A flow sensor chip comprising: a substrate in which a cavity having an opening is formed; a membrane provided on a surface of the substrate so as to cover the opening; a heater provided inside the membrane; a first thermopile and a second thermopile provided in the membrane, the heater being interposed between the first thermopile and the second thermopile; and a heat conduction member serving as a heat conduction path between the substrate and the membrane, wherein a first hot junction and a first cold junction of a thermocouple provided in the first thermopile and a second hot junction and a second cold junction of a thermocouple provided in the second thermopile are arranged at positions overlapping with the opening as viewed from a direction normal to the surface of the substrate; wherein the heat conduction member includes: a first heat conduction member serving as a heat conduction path between the first cold junction and the substrate; and a second heat conduction member serving as a heat conduction path between the second cold junction and the substrate; wherein the first heat conduction member is provided inside the membrane, and extends from the area where the membrane and the substrate overlap with each other, as viewed from the direction normal to the surface of the substrate, to a side of the first cold junction, the second heat conduction member is provided inside the membrane, and extends from the area where the membrane and the substrate overlap with each other, as viewed from the direction normal to the surface of the substrate, to a side of the second cold junction, the first heat conduction member is a metal layer in a rectangular shape or U-shape of which one side is formed along a direction in which the first cold junction of the thermocouple provided in the first thermopile is arranged, and the second heat conduction member is a metal layer in a rectangular shape or U-shape of which one side is formed along a direction in which the second cold junction of the thermocouple provided in the second thermopile is arranged.

* * * * *